US012677984B2

(12) United States Patent
Standaar et al.

(10) Patent No.: US 12,677,984 B2
(45) Date of Patent: Jul. 14, 2026

(54) CONNECTOR FOR A FLUID DISPENSING APPARATUS

(71) Applicant: Koninklijke Douwe Egberts B.V., Utrecht (NL)

(72) Inventors: Koen Standaar, Utrecht (NL); Hendrik Johan Dees, Utrecht (NL); Tobias Kelderman, Nieuw-Vennep (NL); Bas Jongenburger, Nieuw-Vennep (NL); Boris Franzen, Nieuw-Vennep (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 117 days.

(21) Appl. No.: 18/693,932

(22) PCT Filed: Sep. 21, 2022

(86) PCT No.: PCT/EP2022/076223
§ 371 (c)(1),
(2) Date: Mar. 20, 2024

(87) PCT Pub. No.: WO2023/046752
PCT Pub. Date: Mar. 30, 2023

(65) Prior Publication Data
US 2024/0389789 A1 Nov. 28, 2024

(30) Foreign Application Priority Data

Sep. 21, 2021 (GB) ...................................... 2113469

(51) Int. Cl.
A47J 31/60 (2006.01)
A47J 31/44 (2006.01)
B08B 9/032 (2006.01)

(52) U.S. Cl.
CPC ........... *A47J 31/60* (2013.01); *A47J 31/4485* (2013.01); *B08B 9/0321* (2013.01); *B08B 2209/032* (2013.01)

(58) Field of Classification Search
CPC ........... B08B 9/0321; B08B 2209/032; B08B 2209/02; B08B 2209/027; B08B 9/027;
(Continued)

(56) References Cited

U.S. PATENT DOCUMENTS

| | | | |
|---|---|---|---|
| 8,739,688 B2 | 6/2014 | Bockwoldt | |
| 8,763,516 B2 | 7/2014 | Göltenboth | |

(Continued)

FOREIGN PATENT DOCUMENTS

| | | |
|---|---|---|
| CN | 202086294 U | 12/2011 |
| CN | 110693326 A | 1/2020 |

OTHER PUBLICATIONS

International Search Report and Written Opinion, date of mailing Dec. 19, 2022, International Application No. PCT/EP2022/076223 (13 pgs.).

(Continued)

*Primary Examiner* — David J Walczak
(74) *Attorney, Agent, or Firm* — Fitch, Even, Tabin & Flannery LLP

(57) ABSTRACT

A connector for manually connecting a dispensable fluid to a fluid dispensing includes: a cleaning fluid inlet; a dispensable fluid inlet and an outlet, wherein the cleaning fluid inlet is in fluid communication with the outlet via a cleaning fluid flow path, and wherein the dispensable fluid inlet is in fluid communication with the outlet via a dispensable fluid flow path. A fluid dispensing apparatus, such as a coffee dispensing apparatus, may include the connector.

16 Claims, 7 Drawing Sheets

(58) Field of Classification Search
CPC ......... B08B 9/032; A47J 31/60; A47J 31/461;
A47J 31/4485
USPC ............ 222/148, 142.7, 142.9, 145.1, 145.2
See application file for complete search history.

(56) References Cited

U.S. PATENT DOCUMENTS

| | | | | |
|---|---|---|---|---|
| 8,770,099 B2 * | 7/2014 | Reyhanloo | .............. | A47J 31/60 |
| | | | | 134/25.4 |
| 8,893,926 B2 * | 11/2014 | Anderson | ............. | G07F 13/065 |
| | | | | 62/342 |
| 2007/0242561 A1 * | 10/2007 | Agon | ................... | A47J 31/469 |
| | | | | 99/323.1 |
| 2010/0146503 A1 | 6/2010 | Tsai | | |

OTHER PUBLICATIONS

Search Report under Section 17, dated Mar. 9, 2022, United Kingdom Patent Application No. GB2113469.7 (1 pg.).

* cited by examiner

CONNECTOR FOR A FLUID DISPENSING APPARATUS

CROSS REFERENCE TO RELATED APPLICATIONS

This application is a U.S. national phase application of International Application No. PCT/EP2022/076223, filed Sep. 21, 2022, which claims benefit from United Kingdom Application 2113469.7, filed Sep. 21, 2021, which are each hereby incorporated herein by reference in their entirety.

TECHNICAL FIELD OF THE INVENTION

The present disclosure relates to a connector for a fluid dispensing apparatus and a fluid dispensing apparatus comprising the connector. The connector may be used with a coffee dispensing machine to connect a source of milk.

BACKGROUND TO THE INVENTION

Coffee dispensing machines which prepare and dispense coffee beverages are well known in the art. Many of these known machines include the option to dispense beverages which include milk. Milk is typically taken from an external container such as a milk bottle or reservoir which is replenished as required. The external container is typically connected to the dispensing machine via a connector. The connector can directly attach to the container or be attached directly via a flexible conduit.

In order to maintain the quality of the beverages it is necessary to clean the pipework associated with the milk source, including the connector. Examples of prior art which include a cleaning means are provided in U.S. Pat. Nos. 8,763,516, 8,739,688 and US2010/0146503.

U.S. Pat. No. 8,763,516 describes a device for feeding milk from a storage container to a dispensing device, containing a feeding line which can be cleaned. A cleaning mechanism is provided for the exterior of the feeding line which comprises a rinsing area for holding the portion of the feeding line that is to be cleaned. The rinsing area contains hot water, steam, cleaning agent, and cold water intakes, and a connection opening for the detachable introduction of the portion to be cleaned.

U.S. Pat. No. 8,739,688 describes a device for supplying milk from a storage tank to a dispensing element having a supply line with an inlet end which is detachably connected to the storage tank for cleaning.

US2010/0146503 describes a milk supply line which is connectable by hand to a cleaning agent transport line which provides a cleaning agent through the milk supply line and a three way valve.

These prior art apparatuses require a user to attach the milk inlet to the cleaning apparatus prior to and to enable cleaning. This can be disruptive for a user and is subject to human error.

The present invention seeks to provide an improved fluid dispensing apparatus.

SUMMARY OF THE INVENTION

The present invention provides a connector and a fluid dispensing apparatus according to the appended claims. The present invention may provide a method of operating the fluid dispensing machine.

In a first aspect, the present disclosure provides a connector for manually connecting a dispensable fluid to a fluid dispensing apparatus, the connector comprising: a cleaning fluid inlet; a dispensable fluid inlet; and, an outlet, wherein the cleaning fluid inlet is in fluid communication with the outlet via a cleaning fluid flow path, and wherein the dispensable fluid inlet is in fluid communication with the outlet via a dispensable fluid flow path.

The connector may further comprise a main body. The main body may comprise the cleaning fluid inlet and the outlet. The connector may comprise a dispensable fluid connector. The dispensable fluid connector may be detachably attachable to the main body and may comprise the dispensable fluid inlet. The dispensable fluid connector may be configured to connect a dispensable fluid conduit which fluidly connects a source of a dispensable fluid to the connector.

The outlet may be in fluid communication with the cleaning fluid inlet to provide a cleaning fluid flow path through the main body and/or the dispensable fluid connector. The cleaning fluid flow path may comprise a first cleaning fluid flow path through the main body, and a second cleaning fluid flow path through the dispensable fluid connector. The first and second cleaning fluid flow paths may be used independently of one another. The connector may be configurable to select either the first or second cleaning fluid flow paths. The main body may be configurable to select either the first or second configurations.

The cleaning fluid flow path and dispensable fluid flow path may be connected at a convergence upstream of the outlet. An outlet passageway which is common to the cleaning fluid flow path and dispensable fluid flow path may extend between the convergence and the outlet. The outlet passageway may extend through the dispensable fluid connector and/or main body. There may be a plurality of convergences. A first convergence in the main body where the dispensable fluid flow path and cleaning fluid path meet, and a second convergence in the dispensable fluid connector where the second cleaning fluid flow path and dispensable fluid flow path meet.

The connector may further comprise a valve. The valve may be a one-way valve in the dispensable fluid flow path and/or the cleaning fluid flow path. The valve may be located so as to prevent a fluid flow upstream. Either or both of the main body or the dispensable fluid connector may comprise the one-way valve.

The main body may comprise a first body portion and a second body portion configured to rotate relative to each other between a first configuration in which the cleaning fluid inlet is connected to the outlet via the first cleaning fluid flow path, and a second configuration in which the cleaning fluid inlet is connected to the outlet via the second cleaning fluid flow path.

The dispensable fluid connector may be rotatable relative to the main body. The dispensable fluid connector may be rotatable relative to the first body portion or the second body portion. Rotation of the dispensable fluid connector may rotate the first and second body portions relative to one another and between first and second positions to provide the first and second configurations.

The dispensable fluid connector and main body may be connected via a bayonet fitting. The dispensable fluid connector and main body may be connected by an inter-engagement of a projection and a track. The main body may comprise the track. The track may comprise a channel into which the projection can be received. The channel may comprise a first portion provided by the first body portion and a second portion provided by the second body portion. The first portion of the channel may be a closed ended channel sized to receive the projection. The second portion of the channel may be a through channel. The first and second channel portions may be aligned such that the projection passes axially along the channel through the second channel portion and into the first channel portion. The first and second channel portions may be aligned in the first configuration, and misaligned in the second configuration. The projection may be retained within the first channel portion in the second configuration and axially insertable or withdrawable in the first configuration.

The dispensable fluid may be milk.

The dispensable fluid connector may comprise a tube for insertion into a container. The dispensable fluid connector may be connectable to a container.

The dispensable fluid connector may comprise an external surface. The external surface may comprise a gripping feature.

The one-way valve may be a duck bill valve.

The dispensable fluid connector may be disposable. As such, the dispensable fluid connector may be a single use item and replaceable when the container is replaced or replenished or at predetermined intervals. The dispensable fluid connector may comprise a biodegradable material. The biodegradable material may be a plastic. The biodegradable material may be polyactic acid, PLA.

A second aspect of the present disclosure provides a fluid dispensing apparatus. The fluid dispensing apparatus may comprise a connector according to the first aspect of the disclosure or as herein described. The apparatus may be a coffee dispensing machine. The coffee dispensing machine may comprise or be connected to a source of milk via the connector. The connector forms part of a cleaning fluid circuit of the apparatus.

The apparatus may comprise a cleaning system. The cleaning system may comprise one or more source of a cleaning fluid and a cleaning fluid conduit. The cleaning fluid conduit may be attached to the cleaning fluid inlet of the connector. The cleaning fluid conduit may be connected to a drain. The cleaning fluid conduit may comprise a closed circuit through which cleaning fluid can be continuously circulated. The cleaning fluid conduit may comprise a dispensable fluid conduit.

The cleaning fluid may comprise one or more of a water and a cleaning agent. The cleaning agent may be a detergent. The cleaning system may comprise cleaning agent dispenser.

The apparatus may further comprise a controller. The controller may be configured to control a flow of cleaning fluid through the connector. The controller may be configured to provide a flow of cleaning fluid through the connector when the dispensable fluid connecter is attached to the main body and when the dispensable fluid connector is not attached to the main body.

The connector may be fixedly attached to the apparatus.

The cleaning fluid circuit may comprise one or more of a cleaning agent dispenser, a water supply, a water heater, a drain, a fluid dispensing nozzle for dispensing fluid from the apparatus.

In a third aspect of the present disclosure there is provided a method of cleaning a connecter in a drink dispensing apparatus. The method may comprise: connecting a source of dispensable fluid to the connector; circulating a cleaning solution through the connector whilst the source of dispensable fluid is attached to the connector. The method may further comprise disconnecting the source of dispensable fluid from the connector and circulating a cleaning solution through the connector. The method may further comprise scheduling a cleaning operation for the connector, wherein the scheduling is pre-determined. The cleaning operation may be scheduled regardless of whether the connector is connected.

In one embodiment, the method of (autonomous) cleaning may comprise the closing of the outlet dock to isolate the source of dispensable fluid, so that the apparatus can go into a cleaning mode. Preferably, all sub-systems may then be flushed to remove any dispensable fluid remains from the dispensable fluid circuit. Cleaning fluid may then be dispensed into the dispensable fluid circuit. This may occur from a reservoir containing cleaning fluid. The apparatus may heat the cleaning fluid to a temperature of at least 50° C., preferably at least 60° C., preferably at least 70° C., and most preferably approximately 75° C. The apparatus may circulate the cleaning fluid through all sub-systems at the elevated temperature, for a selected time period, for example, at least 2 minutes, preferably at least 3 minutes, preferably at least 4 minutes, and more preferably at least 5 minutes. The cleaning fluid may then be drained from the dispensable fluid circuit. Preferably, all subsystems may then be flushed to remove any remaining cleaning fluid. The outlet dock may then be opened to return the apparatus to the dispensing mode.

The apparatus may be used in an intermediate rinse mode in which the outlet dock may be closed to isolate the source of dispensable fluid, so that the apparatus can go into an intermediate rinse mode. Preferably, all sub-systems may then be flushed to remove any dispensable fluid remains from the dispensable fluid circuit. After this, the outlet dock may then be opened to return the apparatus to the dispensing mode.

The skilled person will appreciate that except where mutually exclusive, a feature described in relation to any one of the aspects, embodiments or examples described herein may be applied mutatis mutandis to any other aspect, embodiment or example. Furthermore, except where mutually exclusive, any feature described herein may be applied to any aspect and/or combined with any other feature described herein.

BRIEF DESCRIPTION OF THE DRAWINGS

In order that the invention may be more clearly understood one or more embodiments thereof will now be described, by way of example only, with reference to the accompanying drawings, of which.

DETAILED DESCRIPTION OF THE INVENTION

Figures 1, 2:
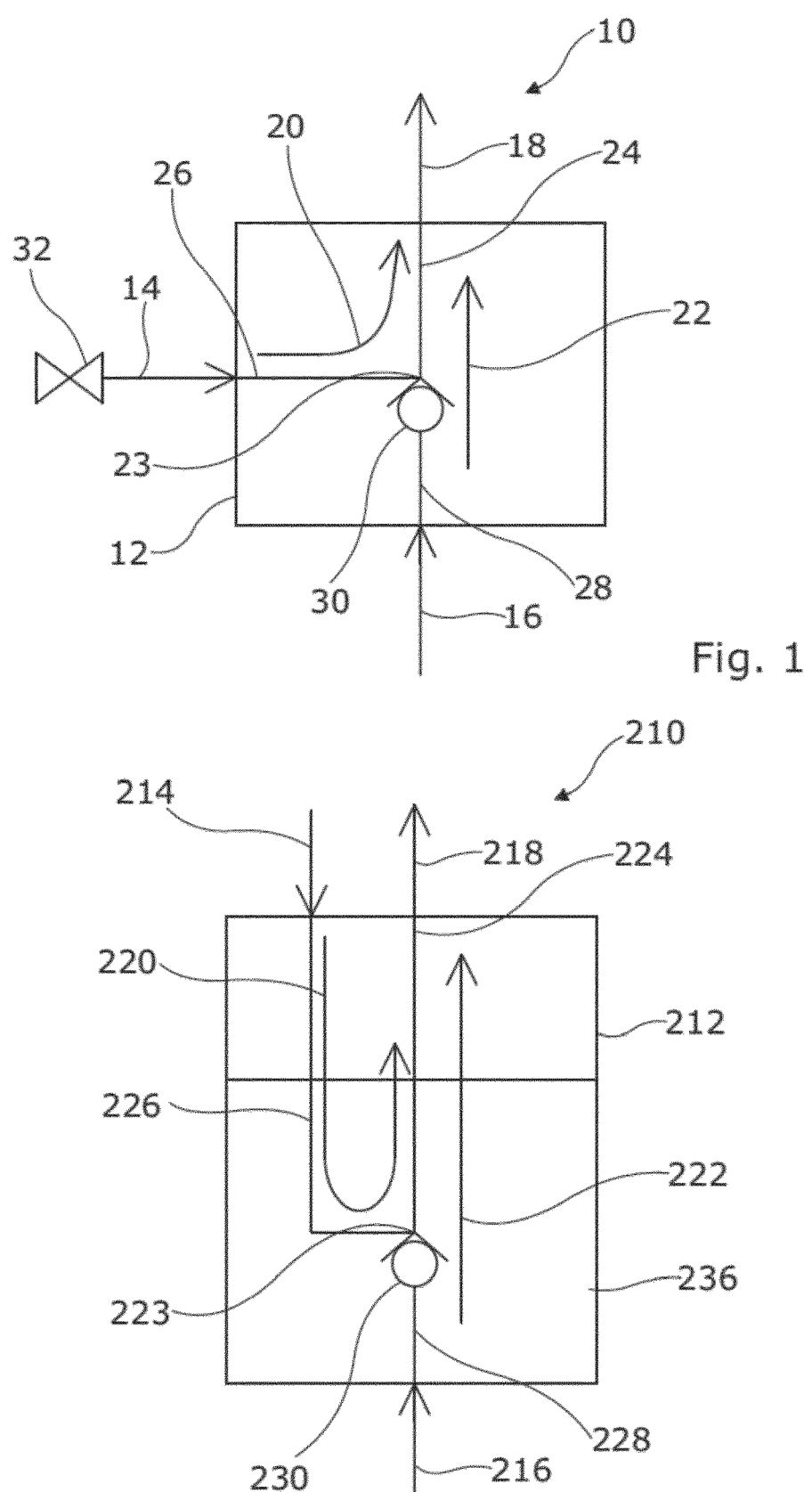
FIG. 1 shows a schematic representation of a connector according to the present disclosure.
FIG. 2 shows a schematic representation of an alternative connector according to the present disclosure.

The present disclosure provides a connector for connecting a dispensable fluid to a fluid dispensing apparatus. The connector may comprise: a first inlet and a second inlet and an outlet. The connector is configured such that a source of dispensable fluid can be detachably attached to the dispensable fluid apparatus by hand and on a regular basis. Thus, the connector may comprise a dispensable fluid connector which is detachably attachable by hand and provides fluid communication with a source of milk. The dispensable fluid connector may be a consumable item which is regularly replaced, or separately cleanable independently of the fluid dispensing machine. The dispensable fluid connector may comprise a biodegradable material.

The first inlet may be a cleaning fluid inlet and the second inlet may be a dispensable fluid inlet. The first and second inlets are configured to be connected to separate fluid supply lines such that a first fluid flow path between the first inlet and outlet, and a second fluid flow path between the second inlet and outlet are defined.

The first fluid flow path may be for a cleaning fluid. The second fluid flow path may be for a dispensable fluid. The cleaning fluid may be any suitable cleaning fluid including water, steam or a cleaning solution containing a cleaning agent such as detergent, for example. The dispensable fluid may be any fluid which is to be dispensed to a user. In the case of a coffee dispensing machine, the dispensable fluid is typically milk, but other fluids are possible, such as a syrup, coffee or other beverage ingredient.

The first and second fluid flow paths may be selectively connected so as to be used independently of one another. The connector may comprise one or more valves, for example, one-way values, to prevent the fluid flow from the first inlet flowing upstream to the second inlet and/or fluid flow from the second inlet flowing upstream to the first inlet.

The connector of the present disclosure is particularly suited to being cleaned. The cleaning of the connector requires minimal interaction or reconfiguring from a user. Hence, the cleaning of the connector and the associated fluid dispensing apparatus can be more automated and require less user interaction and involvement than prior art arrangements.

The connector may include a plurality of cleaning fluid flow paths. Hence, there may be a first cleaning fluid flow path and a second fluid flow path. The first and second fluid flow paths may correspond to a first and second configuration such that, in use, the first cleaning fluid flow path provides fluid communication between the first inlet and outlet in the first configuration, and the second cleaning fluid flow path provides fluid communication between the first inlet and outlet when in the second configuration.

The first configuration may be defined by the connector being detached from a dispensable fluid connector which provides fluid communication with a source of dispensable fluid. The second configuration may be defined by the attachment of dispensable fluid connector.

The connector of the present disclosure may be reconfigurable between the first and second configurations with the attachment of the dispensable fluid connector. Hence, the attachment of the dispensable fluid connector may move the connector between the first and second configurations.

The connector may form part of a cleaning circuit of the dispensable fluid apparatus whether the connector is connected to a source of dispensable fluid or not. Hence, the fluid dispensing apparatus may be permanently configured to be cleaned regardless of whether it is connected to a source of dispensable fluid or otherwise. Given this increased versatility, it is possible to program a fluid dispensing apparatus to undergo a cleaning process outside of normal hours of use without any additional requirements from a user such as disconnecting the source of dispensable fluid, or connecting the pipework which supplies the dispensable fluid to the apparatus to a cleaning mechanism or the like.

FIG. 1 shows a schematic representation of a connector 10 for connecting a dispensable fluid to a fluid dispensing apparatus according to the present disclosure. The connector 10 comprises: a main body 12 having a cleaning fluid inlet 14, a dispensable fluid inlet 16 and an outlet 18.

The cleaning fluid inlet 14 is configured to receive a flow of cleaning fluid in use. The dispensable fluid inlet 16 is configured to receive a fluid for dispensing from the fluid dispensing apparatus. As described below in connection with FIG. 7, the fluid dispensing apparatus may be a beverage dispensing apparatus, such as a coffee dispensing machine and the dispensable fluid may be any fluid which is dispensed from the fluid dispensing apparatus. In the embodiment of a coffee dispensing machine, the connector 10 may be used to connect to a source of milk to the machine, for example. However, this is not a limitation and the connector 10 may be used to connect a source of any dispensable fluid to any dispensable fluid apparatus.

As can be seen from FIG. 1, the outlet 18 is in fluid communication with the cleaning fluid inlet 14 to provide a cleaning fluid flow path 20 along passageways 24 and 26. The outlet 18 is also in fluid communication with the dispensable fluid inlet 16 to provide a dispensing fluid flow path 22 along passageways 24 and 28.

The cleaning fluid flow path 20 and dispensable fluid flow path 22 may join at a convergence 23 within the connector 10 to provide a single passageway which extends to the outlet 18. This combined portion of fluid flow path may be referred to as an outlet passageway 24 of the connector 10. The portions of the cleaning fluid pathway 20 and dispensing fluid pathway 22 upstream of the convergence 23 may be referred to as the first fluid passageway or cleaning fluid passageway 26 and second fluid passageway or dispensable fluid passageway 28. The convergence 23 is shown as being within the main body 12 of the connector 10 but may be located externally to the main body, for example, in a dispensable fluid connector, as described below.

In some embodiments it may be desirable to isolate the cleaning fluid flow path 20 and dispensable fluid flow path 22 from one another. For example, in the case that the dispensable fluid is for human consumption, such as milk, the cleaning fluid in the cleaning fluid flow path 20 may taint the dispensable fluid such that it would need to be disposed of before the fluid dispensing apparatus could be used. As such, the dispensable fluid inlet 16 and, optionally, a portion of the dispensable fluid passageway 28 may be configured so as to be isolatable from the cleaning fluid flow path 22 during a cleaning operation. In other embodiments it may be desirable to additionally or alternatively isolate the cleaning fluid inlet 14 and, optionally, a portion of the cleaning fluid passageway 26 from the dispensable fluid flow 22 during use.

The isolation of the cleaning fluid flow path 20 and dispensable fluid flow path 22 may be achieved with one or more valves. Hence, as shown in FIG. 1, the connector 10 may comprise valve 30 to prevent the cleaning fluid flowing upstream into the dispensable fluid passageway 28 and/or inlet 16. The valve 30 may be a located at the or local to the convergence 23 such that the length of the dispensable fluid flow passageway 28 which is open to the cleaning fluid is minimised. The valve may define the junction between the first and second fluid flow paths and thus define the convergence 23. The valve 30 may be a one-way valve (which may be referred to as a check valve). The one-way valve may be a so-called "duck-bill valve", which are well known in the art.

In some embodiments, the valve 30 may be omitted or may be located external to the connector 10, for example, in a conduit which connects to the dispensable fluid inlet 16.

In embodiments where it is desirable to isolate the cleaning fluid flow passageway 26 and/or inlet 14 from the dispensable fluid flow path 22, the connector 10 may include a cleaning fluid flow path valve which is operable to isolate the cleaning fluid flow passageway 26 and/or inlet 14 from the dispensable fluid flow path 22. As with valve 30, the cleaning fluid flow path valve may be provided internally or externally to the connector 10 and may comprise a one-way valve. In the example shown in FIG. 1, the cleaning fluid flow path 10 is provided with a valve 32 upstream of the connector 10 in a conduit which supplies the cleaning fluid to the connector 10. The valve 32 may be a passive valve, such as a one-way valve, or selectively operable valve which is operatable under the control of a controller (not shown) and in accordance with a cleaning operation.

Each of the inlets 14, 16 and outlet 18 may include features suitable for attaching to a corresponding conduit for the respective inflow and outflow of fluid to the connector 10. The attachment features can be for any suitable attachment known in the art. Such attachment features may comprise features for coupling to or mating with compression connectors, push-fit connectors, compression clips, bolts, flanges, etc. In some embodiments, the connector 10 may comprise a trailing tube or wand which is insertable to a container for dispensable fluid or be connectable to a trailing tube or wand. The connection of the dispensable fluid inlet may be characterised by incorporating a connector which is detachably attached by hand by an end user in order to provide fluid communication with a source of dispensable fluid.

The connector 10 may be floating so as to not be rigidly connected to the dispensing apparatus. Rather, the connector 10 may be connected to the fluid dispensing apparatus via one or more conduits, such as flexible tubes, which connect to the outlet 18 or cleaning fluid inlet 14. In other embodiments, the connector may be fixedly attached to the fluid dispensing apparatus.

In some embodiments, the connector 10 is configured to comprise a connection to a dispensable fluid connector for connecting a source of fluid for dispensing. The dispensable fluid connector may be configured to be detachably attachable by hand. The dispensable fluid connector may comprise an open ended tube for inserting into a dispensable fluid receptacle or may attach to a dispensable fluid receptacle via a suitable coupling.

The main body 12, is shown as having a single piece construction with multiple passageways extending therethrough. However, the main body 12 may comprise multiple parts and may be fabricated using techniques and materials which are commonplace in the art. The position of the inlets 14, 16 and outlet 18, may vary in different embodiments.

Generally, throughout the disclosure, the use of the terms upstream and downstream are used to refer to the fluid flow direction from inlet to outlet. Hence, the each of the respective inlets 14 and 16 are upstream of the outlet 18.

Generally, throughout the disclosure, similar features have similar reference numerals across the figures incremented by a multiple of 100. Where such features are common to all embodiments, description may be omitted for the sake of brevity and the description from elsewhere may be relied upon.

As described above, the connector 10 may comprise a dispensable fluid inlet which is characterised by a conduit which is detachably attachable to the connector 10 by hand. FIG. 2 shows an embodiment of a connector 210 which comprises; a main body 212 having a cleaning fluid inlet 214; a dispensable fluid connector 236 which is detachably attached to the main body 212 and which comprises a dispensable fluid inlet 216; and, an outlet 218.

The cleaning fluid inlet 214 is configured to receive a flow of cleaning fluid in use. The dispensable fluid inlet 216 is configured to receive a fluid for dispensing from a fluid dispensing apparatus (not shown). As with the embodiment described in FIG. 1, the outlet 218 is in fluid communication with the cleaning fluid inlet 214 to provide a cleaning fluid flow path 220 and in fluid communication with the dispensable fluid inlet 216 to provide a dispensing fluid flow path 222.

The first fluid flow path 220 and second fluid flow path 222 join at a convergence 223 to provide an outlet passageway 224 which extends to the outlet 218. The portions of the cleaning fluid pathway 220 and dispensable fluid pathway 222 upstream of the convergence 223 may be referred to as the cleaning fluid passageway 226 and dispensable fluid passageway 228. The convergence 223 is shown as being within the dispensable fluid connector 236 which contrasts with the embodiment described in connection with FIG. 1 where the convergence 23 was provided in the main body 12.

As with the embodiment described in connection with FIG. 1, the connector 210 may include one or more valves for isolating one or more sections of the cleaning fluid path and dispensable fluid path from the other of the cleaning fluid path and dispensable fluid path. The valve(s) may be internal or external and may be one-way valves. FIG. 2 shows a single one-way valve 230 by way of example, but this is not a limitation and other valves as described herein may be included.

The dispensable fluid connector 236 maybe detachably attached to the main body 212 of the connector 210 by a suitable fitting. For example, the attachment may be provided by a screw thread, push fit, interference fit or bayonet fitting, for example.

As shown in the embodiment of FIG. 2, the cleaning fluid flow path 220 may extend into the dispensable fluid connector 236, rather than being contained within the main body 212, as shown in the embodiment of FIG. 1. As such, the dispensable fluid connector 236 receives cleaning fluid during a cleaning operation. To enable this, the convergence 223 and valve 230 may be located within the dispensable fluid connector 236. The cleaning fluid flow passageway 226 and/or outlet passageway 224 may extend through the main body 212 such that the cleaning fluid inlet 214 and outlet 218 are always attached to the connector 210, irrespective of whether the dispensable fluid connector 236 is connected.

As noted, the dispensable fluid connector 236 may be detachably attached to the main body 212 of the connector 210 so as to be attached or detached by hand. As such, an external surface of the dispensable fluid connector may include a gripping portion comprising one or more gripping features by which a user may more readily grasp the dispensable fluid connector 236 by hand. The gripping portion may comprise a surface texture or ridges or grooves or one or more projections or ribs, for example.

The main body 212 of the connector 210 may be fixedly attached to the fluid dispensing apparatus either directly or via any structure which forms part of or is associated with the fluid dispensing apparatus. Alternatively, the main body may be floating so as to be not fixedly attached to the fluid dispensing apparatus. For example, the main body 210 may be connected to the fluid dispensing apparatus by a flexible pipe or tube which extends between the connector and apparatus.

It will be appreciated that, in the embodiment of FIG. 2, the connection of the main body 212 to the dispensable fluid connector 236 may align and sealably connect the corresponding portions of the cleaning fluid passageway 226 and outlet passageway 224.

In some embodiments, a connector may comprise a cleaning fluid flow path comprising a plurality of separate passageways between one or more cleaning fluid inlets and the fluid outlet. The cleaning fluid flow path may comprise a bifurcation in which a first cleaning fluid flow path extends through the main body to the outlet, and a second cleaning fluid flow path extends through the dispensable fluid connector to the outlet. The separate first and second fluid cleaning fluid flow paths may be configured to be used separately in parallel or in combination with one another. Thus, in some embodiments, cleaning fluid may flow through the main body of the connector and dispensable fluid connector. In other embodiments, the first and second cleaning fluid flow paths may be independently operable such that only one of the cleaning fluid paths is used at any one time. Hence, portions of the first and second cleaning fluid flow paths may be isolated from either or both of the first fluid inlet and outlet when not in use.

Figures 3A, 3B:
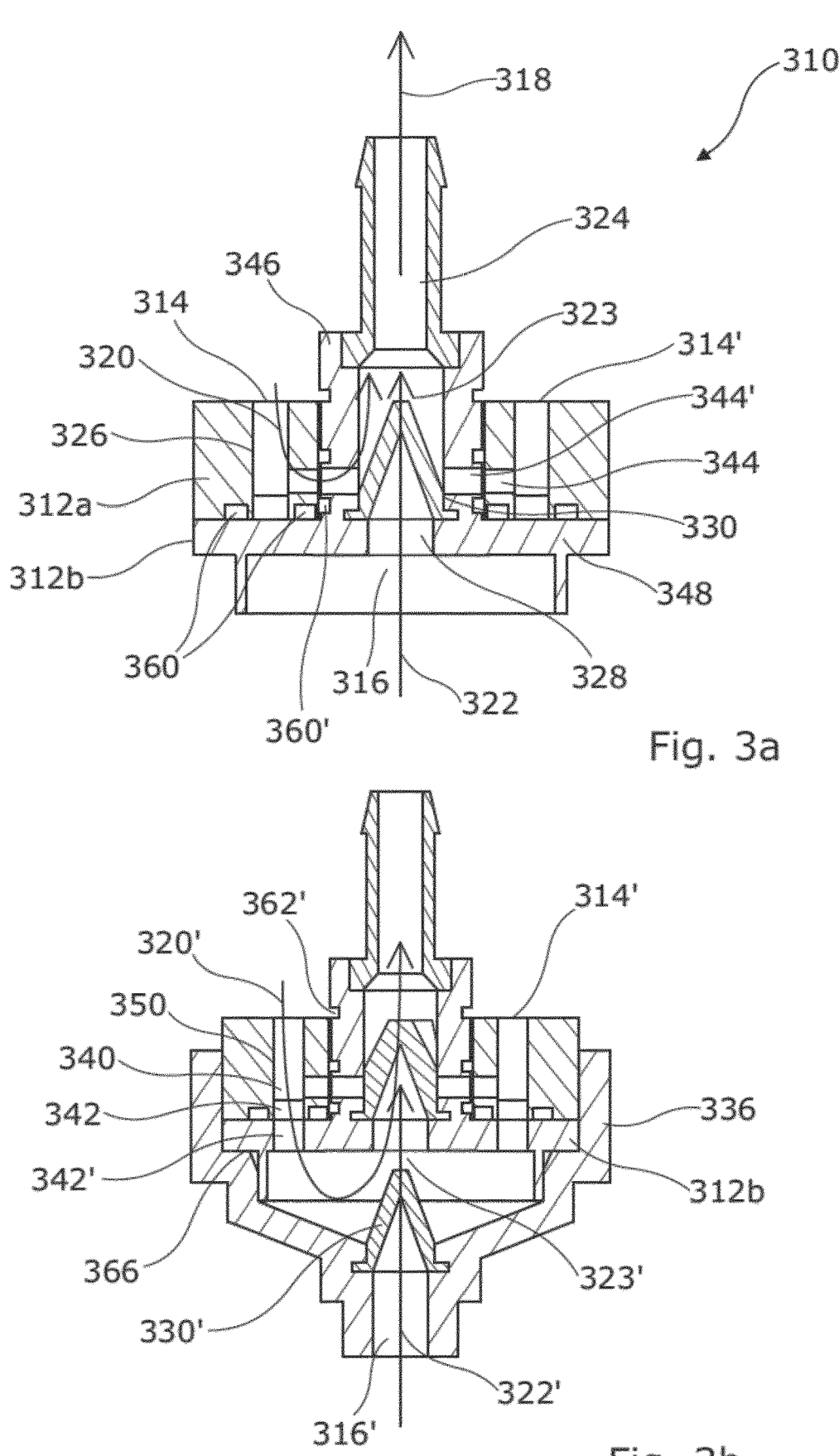
FIGS. 3a and 3b show a longitudinal section of a connector according to the present disclosure having a plurality of cleaning fluid flow paths.
Figure 3C:
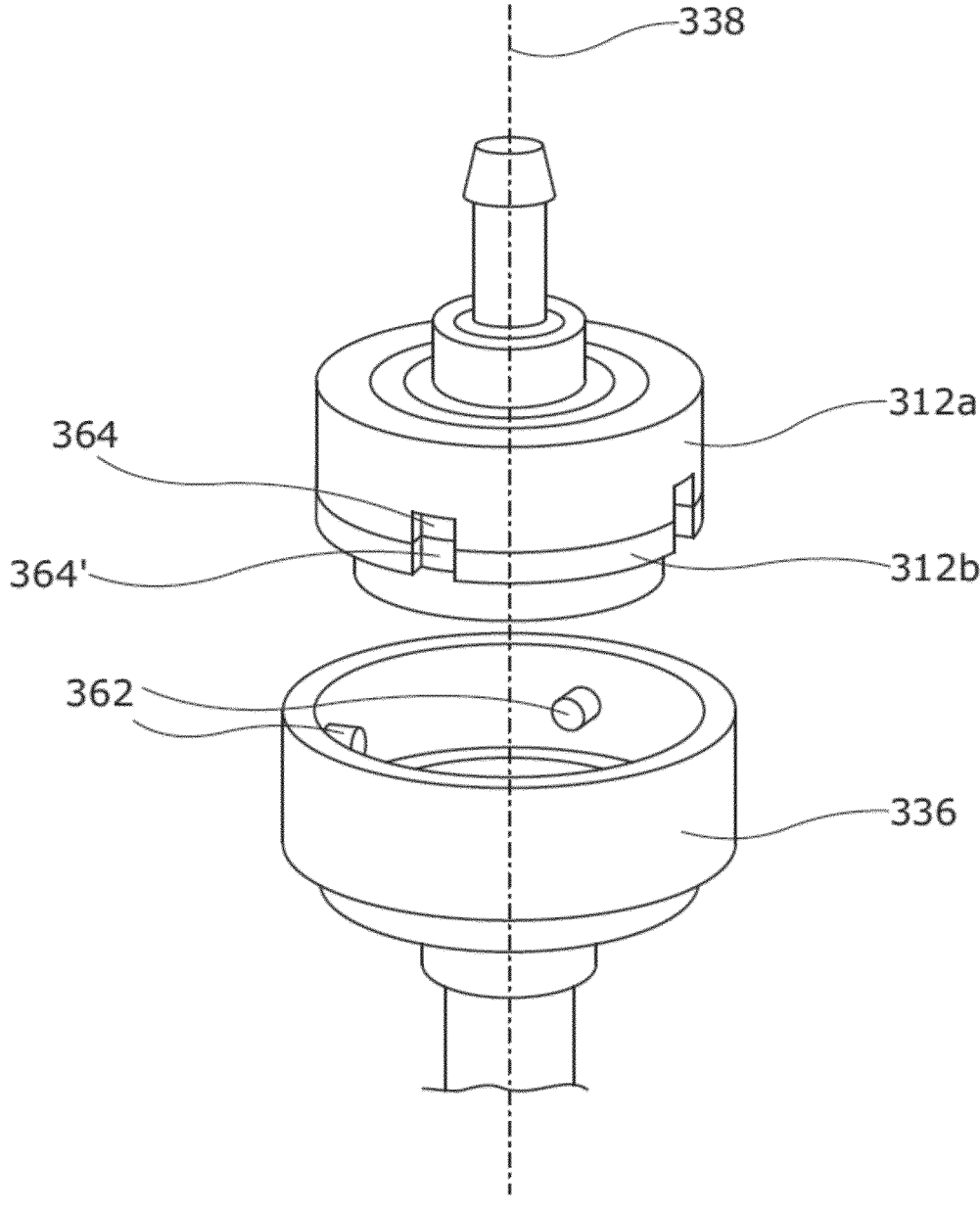
FIG. 3c shows a perspective partially axially exploded view of the connector of FIGS. 3a and 3b.

FIGS. 3a to 3c show an embodiment of a connector 310 according to the present disclosure. The connector 310 may comprise a main body 312a, 312b; an outlet 318; a cleaning fluid inlet 314 and a dispensable fluid inlet 316. Cleaning fluid 320 and dispensable fluid 322 flow paths are provided between the respective cleaning fluid inlet 314 and outlet 318, and dispensable fluid inlet 316 and outlet 318. FIG. 3a shows the connector 310 without a dispensing fluid connector 336 detached. FIG. 3b shows the connector 310 with the dispensing fluid connector 336 attached. FIG. 3c shows an external perspective exploded view of the connector 310 in which the main body 312a, 312b and dispensable fluid connector 336 are displaced along the central axis 338 of the connector 310 in a pre-attached configuration.

The cleaning fluid flow path comprises a first cleaning fluid flow path 320 shown in FIG. 3a, and a second cleaning fluid flow path 320' shown in FIG. 3b. The first cleaning fluid flow path 320 and second cleaning fluid flow path 320' are configured to be separately selectable such that cleaning fluid passes sealably through the main body 312 along the first cleaning fluid flow path 320 only when the dispensable fluid connector 336 is not attached, and along the second cleaning fluid flow path 320' when the dispensable fluid connector 336 is attached. Hence, when the dispensable fluid connector 336 is attached, the first fluid pathway extends 320' through the main body 312, the dispensable fluid connector 336 and back through the main body 312 to the outlet 318. When the dispensable fluid connector 336 is not attached, the first fluid pathway 320 may extend through the main body 312 directly from the cleaning fluid inlet 314 to the outlet 318 and entirely within the main body 312. Further, when the dispensable fluid connector 336 is attached, the second fluid pathway 322' extends through the dispensable fluid connector 336 into the main body 312 to the outlet 318. When the dispensable fluid connector 236 is not attached, the first fluid flow path 320 may extend through the main body 312 only.

It will be appreciated that, the dispensable fluid inlet 316 described herein may only act as a fluid inlet, in use, when the dispensable fluid connector 336 is attached. In instances where the dispensable fluid connector 336 is not attached, the main body may comprise the dispensable fluid inlet in the form an opening or valve inlet which provides part of the dispensable fluid flow path 322 in use.

The connector 310 may be configurable to select between the first cleaning flow path 320 and the second cleaning flow path 320'. Hence, the connector 310 may be adapted to open or close either or both the first 320 and second 320' cleaning fluid flow paths.

In the embodiment of FIGS. 3a to 3c, the main body 312 comprises a valve arrangement which is operable to open and close the first 320 and second 320' cleaning fluid flow paths as required. The valve may comprise one or more individually operable valves units provided in each of the flow paths, or may be achieved by moving parts of the connector 310 relative to each other to provide selective alignment between passageways corresponding to the first 320 and second 320' cleaning fluid flow paths.

In some embodiments, switching between the first cleaning fluid flow path 320 and second cleaning fluid flow path 320' may be provided by relative rotation of different parts of the main body 312. Thus, as shown in FIGS. 3a and 3b, the main body 312 may comprise a first body portion 312a and a second body portion 312b which are arranged to rotate relative to one another about the central axis 338 (shown in FIG. 3c) of the main body 312. In use, either of the first 312a or second 312b body portions may be held in a stationary relation with regards to the fluid dispensing apparatus, whilst the other of the first 312a or second 312b body portion is rotated.

Relative rotation of the first 312a and second 312b body parts may transform the main body 312 from a first configuration in which the first cleaning fluid flow path 320 is open and the second cleaning fluid flow path 320' is closed, and a second configuration in which the second cleaning fluid flow path 320' is open and the first cleaning fluid pathway 320 is closed. The first configuration may be provided by the first body portion 312a having a first angular alignment with respect the second body portion 312b and the second configuration may be provided by the first body portion 312a having a second angular alignment with the second body portion 312b which is different to the first angular alignment. The amount of rotation required to move between the first and second configurations may be any desired for re-aligning the various passageways. In some embodiments, the rotation may be 180 degrees or less, preferably 90 degrees or less, and more preferably 45 degrees or less.

As shown in FIGS. 3a and 3b, the first body portion 312a may comprise the first inlet 316 and a bifurcation 340 which provides a junction between the first 320 and second 320' cleaning fluid flow paths. The respective portions of the first 320 and second 320' cleaning fluid flow paths may comprise passageways 342, 344 which align with corresponding first and second cleaning fluid passageways 342', 344' in the second body portion 312b. The respective cleaning fluid passageways 342, 342' and 344, 344' are angularly displaced about the central axis 338 such that the first cleaning fluid passageway 342 of the first body portion 312a is aligned with the first cleaning fluid passageway 342' in the second body portion 312b when the main body 312 is in the first configuration (FIG. 3a), and the second cleaning fluid passageway 344 of the first body portion 312a is angularly aligned with the second cleaning fluid passageway 344' of the second body portion 312b in the second body portion 312 in the second configuration (FIG. 3b). The second body portion passageways 342' and 344' extend into the outlet passageway 324 of the main body 312 either directly, in the case of the first cleaning fluid flow path 320, or via the dispensable fluid connector 336, in the case of the second cleaning fluid flow path 320'.

In the embodiment shown, the second body portion 312b comprises a central column 346 in which the outlet passageway 324 is housed, and a radially extending flange 348. The column 346 comprises a first end which provides the outlet 318 and a connection portion for mating with a conduit which is configured to receive the fluid outputted from the connector 310. A second opposing end of the column 346 may comprise the flange 348 and may receive or be received within the dispensable fluid connector 336. The mating of the dispensable fluid connector 336 with the main body 312 may define a chamber which is in fluid communication with passageway 342'.

The first body portion 312a may comprise an annular collar having a central bore in which the column is rotatably received. As such, the first 312a and second body 312b portions are co-axially nested on the central axis 338.

The initial portion of the first and second cleaning fluid flow paths 320, 320' by a common passageway 350 upstream of the bifurcation 340. This is shown as axially extending from an upper surface of the first body portion 312a, but may be provided by a tangentially, radially or axially extending passageway. The first cleaning fluid flow path 320 may comprise a passageway 344 having a radial component (shown as being exclusively radial in FIG. 3a) which corresponds to a radially extending passageway 344' in the column 346 in the second body portion 312b. The passageway 342 of the second fluid flow path 320' provided in the first body portion 312a may extend axially to the radially extending flange 348 of the second body portion 312b. As shown in FIG. 3b, the second body portion 312b includes the corresponding axially extending passageway 342' which extends through the flange 348 into the chamber defined by the mating of the dispensable fluid connector 336.

As shown in FIG. 3a, there may be a plurality of cleaning fluid inlets 314, 314' distributed about the central axis of the connector 310. Two are shown in the section of FIG. 3a but this is not a limitation and there may be more or fewer first inlets than this. The plurality of first inlets 314, 314' may be evenly distributed about the central axis 338.

It will be appreciated that the fit between the first body portion 312a and second body portion 312b may be sufficiently close so as to allow the respective passageways 342, 342', 344, 244' of the first 320 and second 320' cleaning fluid flow paths to be sealably connected in the respective configurations, whilst still allowing the relative rotation of the first 312a and second 312b body portions. In order to facilitate this, the connector 310 may comprise one or more seal elements or gaskets. The seals or gaskets may be provided in recesses 360, 360' as shown adjacent to and envelope the terminal ends of the flow passageways 342, 342', 344, 344'. The recesses 360, 360' may receive o-rings or other suitable seal elements which bare against the opposing wall of the respective main body portion 312a, 312b to provide a seal.

The first and second body portions 312a, 312b, may be attached to one another to prevent separation once assembled. In the embodiment of FIG. 3a, an axial retention feature is provided by a further recess 362' which is provided in an external surface of the column 348 of the second main body portion 312b. The recess 362' is axially adjacent, e.g. flush, to the upper surface of the first body portion 312a so as to receive a retention device such as a circlip which axially retains the first body portion 312a and maintains the rotatable axial alignment of the first and second body portions 312a and 312b.

As noted in FIGS. 3a and 3b, the connector 310 may comprise one or more valves to prevent backflow of fluid upstream. The valves may be any suitable known in the art or as described herein. In the embodiment shown, the valves 330, 330' are duckbill valves located at each of the points of convergence 323, 323' of the cleaning fluid flow path 320, 320' and dispensable fluid inlet 316, 316' within the dispensable fluid connector 336 and second body portion 312b respectively.

As previously described, the dispensable fluid connector 336 and main body 312 may be coupled together using any suitable fitting and/or interlock. In the embodiment shown in FIGS. 3a to 3c, a bayonet fitting is used. The bayonet fitting may comprise an interlock which allows the main body 312 and dispensable fluid connector 336 to be axially coupled along the central axis 338 of the connector 310, prior to being rotated about the central axis 338 to provide an interlock which prevents the dispensable fluid connector 336 being withdrawn axially.

The bayonet fitting may comprise any combination of projections and tracks to enable the described engagement and interlock. In the embodiment of FIG. 3c, the dispensable fluid connector 336 comprises a plurality of lugs 362 which extend radially inwards from an inner wall of the dispensable fluid connector 336 to be received by corresponding tracks 364, 364', e.g. grooves, located on an external surface of the main body 312. In the embodiment of FIG. 3c, there is shown four equidistantly spaced projections 362 on an upper edge of the dispensable fluid connector 336, however, any of the number, position and relative spacing of the projections 362 may differ in other embodiments. Further, in other embodiments, the projections 362 may be provided on main body 312 with the track 364, 364' being provided on the dispensable fluid connector 336.

In embodiments which incorporate a two-part main body 312 in which first 312a and second 312b body portions rotate relative to one another, such as the one shown in FIGS. 3a to 3c, the dispensing fluid connector 336 and main body 312 may be configured such that the connection of the dispensing fluid connector 336 causes the relative rotation and the shift between the first and second configurations. For example, in the case of a bayonet fitting, the rotation of the dispensable fluid connector 336 may cause the rotation of either the first body portion 312a or the second body portion 312b relative to the other of the first 312a or second 312b body portion. In the embodiment of FIGS. 3a to 3c, the relative rotation is achieved by the dispensable fluid connector 336 being rotatably engaged with the first body portion 312a following an initial axial insertion.

To enable this in the described embodiment, first 312a and second 312b body portions may provide respective portions of an elongate channel 364, 364' which is sized to receive the radially extending projections 362 of the dispensable fluid connector 336. The elongate channel comprises a first portion 364 in the first body portion 312a which is distal to the dispensable fluid connector 336, and a second portion 364' in the second body portion 312b which is proximal to the dispensable fluid connector 336. The first 364 and second 364' channel portions are aligned when the main body 312 is in the first configuration such that the projections 362 can be received by an open end of the second channel portion 364' and travel axially along the channel to be received within the first channel portion 364 when the dispensable fluid connector 336 is axially urged fully onto the main body 312.

Once the main body 312 and dispensable fluid connector 336 are axially mated, the radially extending projections 362 are fully received within the first channel portion 364 such that the dispensable fluid connector 336 can be rotated with the first body portion 312a without fouling on or being blocked by the second body portion 312b. Once rotated, the first 364 and second 364' channel portions become angularly misaligned such that the radial projections 362 are confined within the first channel portion 364 and axial withdrawal is prevented by an opposing wall of the flange 348 of the second body portion 312b.

Hence, the connector 310 may comprise a second body portion 312b which may comprise an external surface having notch or groove therein providing a through-passage for a projection 362 of a bayonet fitting. The first body portion 312a may comprise an external surface having a notch or groove having a closed ended cavity in which the projection 362 can be fully received and retained when the interlock is axially engaged and the main body 312 is rotated into the second configuration.

It will be appreciated that, in some embodiments, the main bayonet fitting may be achieved by providing a channel or track of the main body 312 which does not require the relative to rotation of different parts of the main body 312, but which provides the necessary interlock to prevent axial withdrawal when engaged. Such a track may be L- or J-shaped having an axial part and a rotational part, as is well known for bayonet fittings.

As shown in FIGS. 3a to 3c, the main body 312 may be axially and concentrically received within the dispensable fluid connector 336. As such, the dispensable fluid connector 336 may comprise a cup-like structure comprising a radially extending axial end wall and an axially extending circumferential wall which in combination define an internal volume into which the main body 312 can be received. In the case where a first 312a and second 312b body portion are provided, the first and second body portions may have corresponding external diameters so as to provide a continuous outer wall with a uniform diameter.

The axial extent of the travel of the dispensable fluid connector 336 may be determined by one or more axial stops. In the embodiment shown in FIGS. 3a to 3c, the axial stop may be provided by the projections being received with the axial channel, and/or by corresponding axially facing shoulders 366 provided on the main body 312 and dispensable fluid connector 336.

As shown, the outlet 318, or either of the inlets 314, 316, may comprise or form part of a connector or coupling to connect or be coupled to a fluid conduit such as a pipe, tube, or passageway. In some embodiments, as described herein, the dispensable fluid connector 336 may be attached to or comprise an integrally formed conduit for the insertion to or connection with a dispensable fluid receptacle.

FIGS. 4a to 4c, 5a, 5b, 6a and 6b show an alternative embodiment of a connector 410. Many aspects of the connector 410 are similar to those described above and the description of features is generally not repeated.

Figures 4A, 4B, 4C:
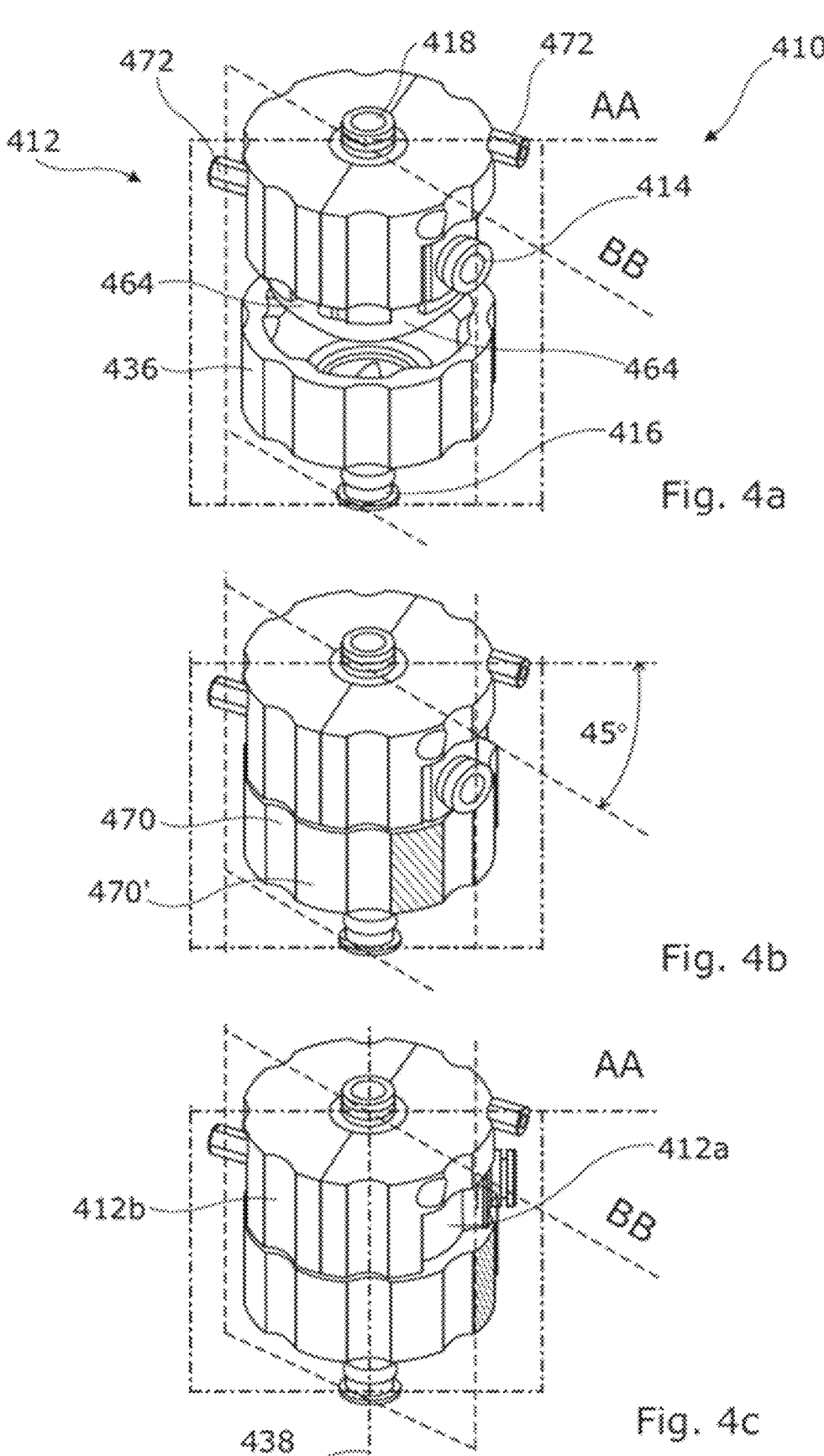
FIGS. 4a to 4c show the steps for connecting a dispensable fluid connector to a main body of a connector of a yet further embodiment.

FIGS. 4a to 4c show the principal steps for attaching a dispensable fluid connector 436 to a main body 412 of a connector 410. Planes AA and BB indicated by the dashed lines correspond to the drawings shown in FIGS. 5a and 6a, and FIGS. 5b and 6b respectively. More specifically, FIG. 5a corresponds to section AA of FIG. 4a, FIG. 5b corresponds to section BB of FIG. 4a, FIG. 6a corresponds to section AA of FIG. 4c, and FIG. 6b corresponds to section BB of FIG. 4c. The planes are angularly offset by 45 degrees which corresponds to the relative rotation between the first and second configurations and which is nominally chosen for this embodiment but other angles of rotation are possible.

The connector 410 comprises a main body 412 having a first body portion 412a and a second body portion 412b and a dispensable fluid connector 436 which is detachably attachable to the main body 412. A cleaning fluid inlet 414 is provided on a side wall of the main body 412, specifically the first body portion 412a; a dispensable fluid flow inlet 416 is provided by the dispensable fluid connector 436; and, an outlet 418 is provided on an axial end wall of the main body 412, specifically the second body portion 412b. The dispensable fluid inlet 416 and outlet 418 are co-axially aligned with the central axis 438 of the connector 410 and have a flow passage extending therebetween.

As shown, the external surface of the dispensable fluid connector 336 may comprises a plurality of longitudinal axially extending grooves 470 and/or ridges 470' which provide a gripper to aid a user to grip the connector 410 to aid with the attachment and rotation of the dispensable fluid connector 436. Similar gripper features may also be included in on the main body 412. As shown the second body portion may comprise an external skirt which extends circumferentially around the first body portion. The skirt may comprise a window through which the cleaning fluid inlet projects and rotates. The gripper features may be provided on the exterior surface of the skirt or first body portion where appropriate, for example, where a skirt is not used or present.

Fixing structures 472 are provided on the external wall of the main body 412. Only a portion of the structures are shown in FIGS. 4a to 4c, however, it will be appreciated that these may be used to fixedly attach the main body 412 of the connector to a fluid dispensing apparatus.

The dispensable fluid connector 436 comprises a circumferential side wall 474 and an axial end wall 476 which define between them a cavity into which a portion of the main body 412 can be received. An internal surface for the circumferential sidewall comprises a plurality of radially extending projections 462 which are received within corresponding channels on an external wall 464 of the main body 412. FIGS. 5a to 6b show an arrangement having five equidistantly distributed projections 462, however, the connector 410 may comprise fewer or more than five projections.

The first body portion 412a comprises an annular collar having a central bore in which a central column 446 of the second body portion 412b is rotatably received such that it can be moved between the first and second configurations. The second body portion 412b comprises the central column 446 which lies along and defines the central axis 438 of the connector 410. Each end of the central column 446 may comprise a radially extending flange between which is located the first body portion 412a.

The dispensable fluid connector end of the column may comprise an integrally formed flange 448 in which there is at least one fluid passageway 442' to provide fluid communication between the first body portion 412a and the cavity defined by the dispensable fluid connector 436 which is in fluid communication with the outlet 418. The distal end of the central column 446 may comprise a radial flange 448' which is attached to the central column 446 once the first body portion 412a has been mounted to the column 446 thereby axially retaining it thereon. The aforementioned skirt appends from the circumferential edge of the radial flange 448' so as to envelope the first body portion.

The first body portion 412a comprises an annular chamber 478 which is sealed against the central column 446 with axial seal elements on either side thereof, as previously described herein. The annular chamber 478 is in fluid communication with the cleaning fluid inlet 414 via a first passageway 450, and the outlet passageway 424 via a second passageway, 444', and the dispensable fluid connector 436 via third passageway 442'. The connection between the annular chamber 478 and the second 444' and third 442' passageways is provided by a common passageway 450' in the first body portion.

Hence, as shown in FIGS. 4a to 6b, a connector 410 may comprise first and second body portions 412a, 412b which are configured to rotate relative to one another between a first and second configurations. The first and second main body portions 412a, 412b, may comprise a first cleaning fluid flow path 420 between a cleaning fluid inlet 414 to an outlet passageway 424 and outlet 418. The first cleaning fluid flow path may comprise first body portion passageways 450, 478, 450' and second body portion passageway 444'. First and second main body portions 412a, 412b, may comprise a second cleaning fluid flow path 420' between a cleaning fluid inlet 414 to an outlet passageway 424 and outlet 418. The second cleaning fluid flow path 420' may comprise first body portion passageways 450, 478, 450' and second body portion passageway 442'.

The first passageway 450 may extend radially between the annular chamber 478 to the cleaning fluid inlet 414 through the first body portion 412a. The second passageway 450' may extend axially and radially from a bottom surface of the annular chamber 478. Passageway 444' may extend axially downstream and radially inwards towards the central axis 448 so as to have a trajectory inclined towards and in the same axial direction of the outlet passageway 424. The exit trajectories for the first and second cleaning fluid flow paths may impinge upon an outer surface of the respective valves 430, 430', when employed.

Passageway 442' in the second body portion 412b extends radially and axially upstream towards the dispensable fluid inlet 416 and valve 430' in the dispensable fluid connector 436.

Figures 5A, 5B:
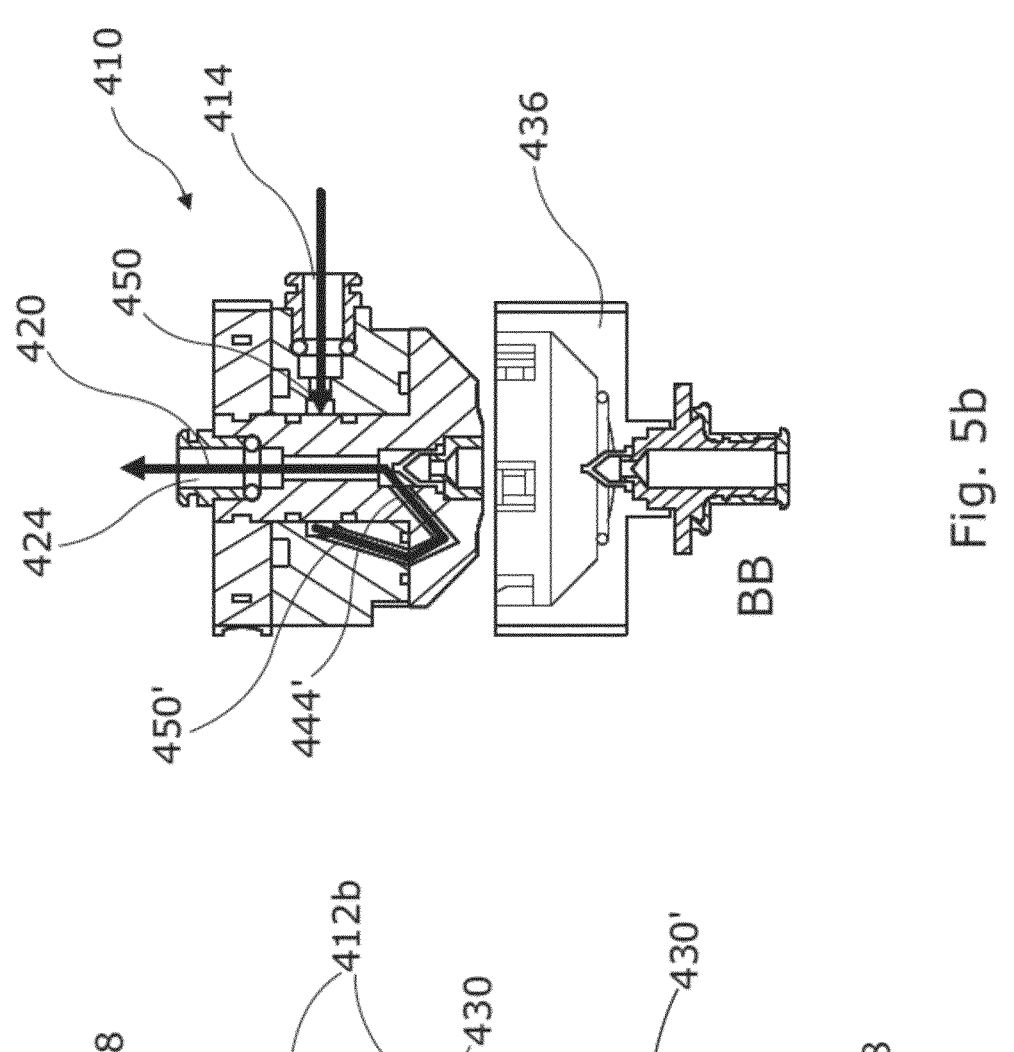
FIGS. 5a and 5b show longitudinal sections of the connector of FIG. 4a in the planes AA and BB, respectively.
Figure 6B:
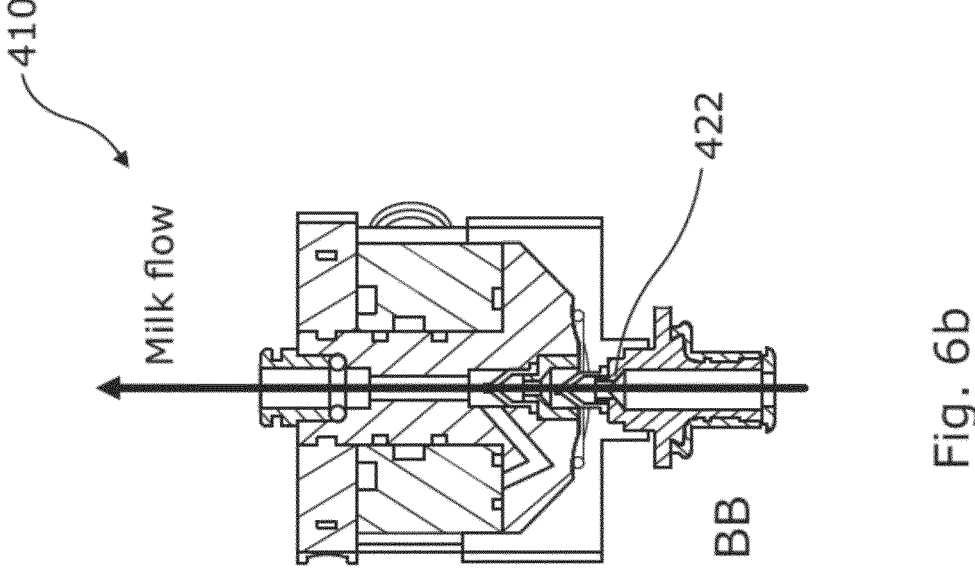
FIGS. 6a and 6b show longitudinal sections of the connector of FIG. 4c in the planes AA and BB, respectively; and, FIG. 7 shows a schematic representation of a drink dispensing apparatus according to the present disclosure.
Figure 6A:
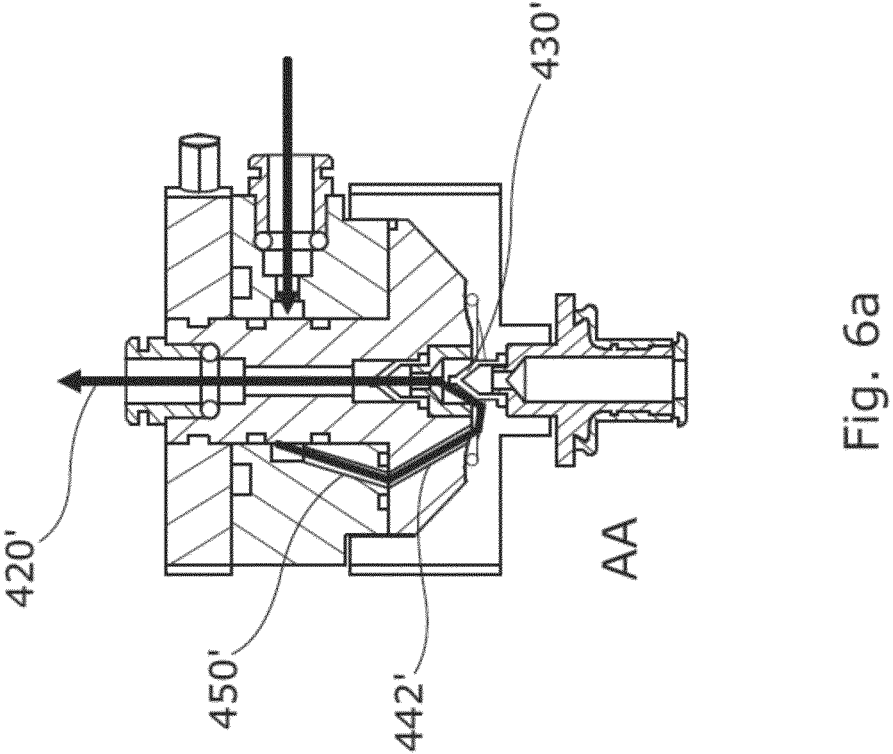

Passageways 442' and 444' are circumferentially displaced around second body portion 412b. Thus, as shown in FIGS. 5a and 5b, when the connector is in the first configuration, the cleaning fluid flow path 420 is provided through the main body 412 and outlet 418 with the second cleaning fluid flow path closed, and when in the second configuration, as seen in FIG. 6a, the second cleaning fluid flow path 420' is diverted through the dispensable fluid connector 436 to the outlet 418. FIG. 6b shows the dispensable fluid flow path 422 when in the connector 410 is in the second configuration and not undergoing a cleaning operation.

To attach the dispensable fluid connector 436 to the main body 412, the dispensable fluid connector 436 is axially mated to the main body 412, moving from the position shown in FIGS. 4a, 5a and 5b, to FIG. 4b. Once axially mated, the dispensable fluid connector 436 is rotated to engage the bayonet interlock and provide the connector 410 in the second configuration. This can be seen in FIGS. 4c, 6a and 6b.

As can be seen from FIGS. 4b and 4c, the rotation of the first body portion 412a with rotation of the dispensable fluid connector 436 causes the associated rotation of the cleaning fluid inlet 414. The angular displacement of the first 412a and second 412b body portion can be any suitable amount. In the embodiment shown, the angular displacement is 45 degrees, however, this is not a limitation and a smaller or greater degree of rotation may be possible.

The above described embodiments provide a connector which can be cleaned whether or not a dispensable fluid connector is attached. In the case where the dispensable fluid connector is not attached, the connector is configured to have a cleaning fluid flow path from a cleaning fluid inlet to an outlet passing only through a main body of the connector. When the dispensable fluid connector is connected, the cleaning fluid flow path is diverted through the dispensable fluid connector such that the full extent of the dispensable fluid flow path can be cleaned regardless of whether the source of dispensable fluid is connected, and without further interaction with a user. As such, it becomes possible for a cleaning process to become more automated.

Figure 7:
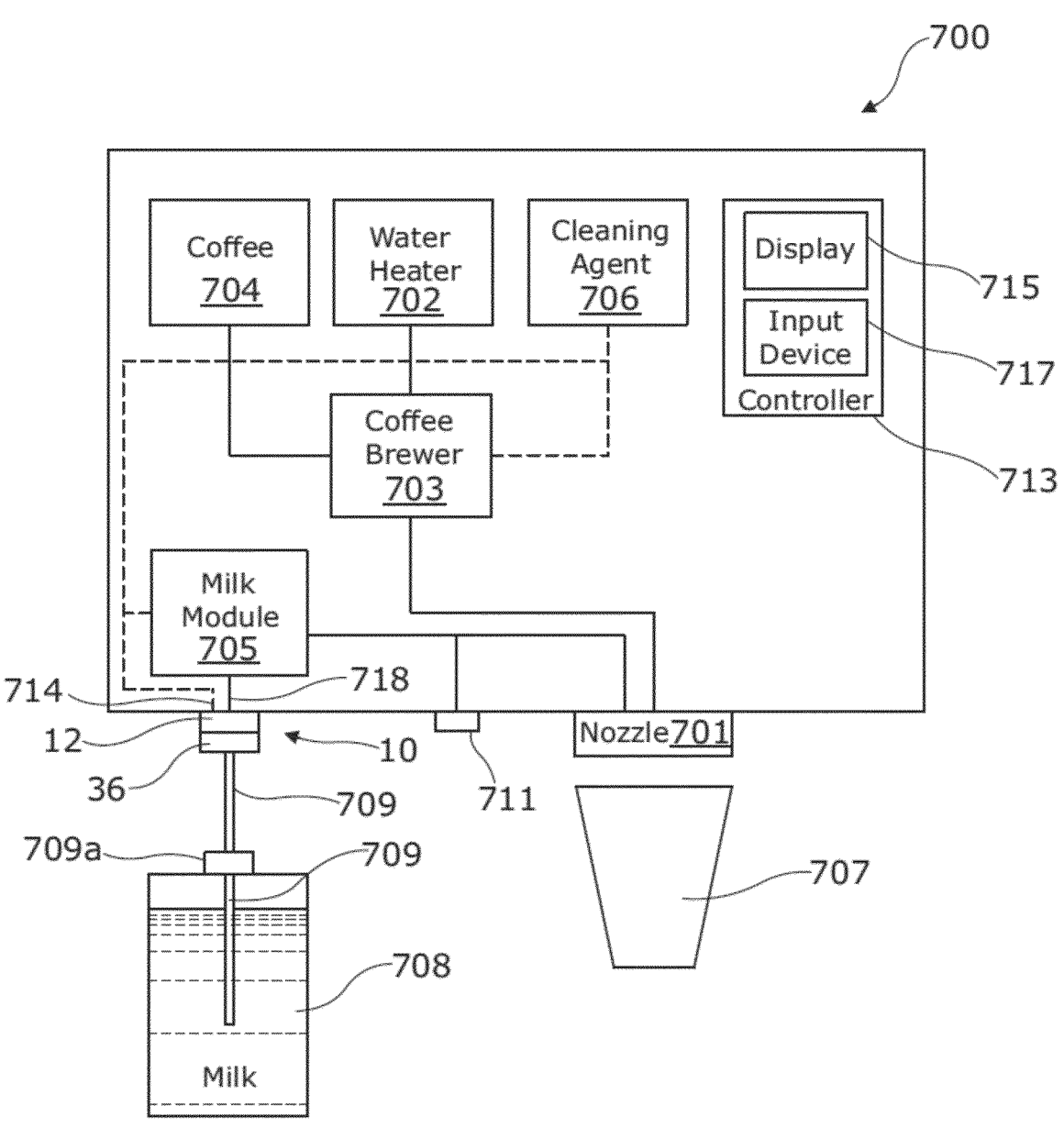

FIG. 7 shows a fluid dispensing apparatus in the form of a coffee dispensing machine 700. The coffee dispensing machine 700 comprises a dispensing nozzle 701, a water heater 702, a coffee brewing module 703, a coffee hopper 704, a milk module 705, and a cleaning agent depository 706.

The coffee brewing module 703 is configured to receive hot water from the water heater 702 and coffee from the coffee hopper 704 and brew coffee for delivery from the dispensing nozzle into cup 707. The milk module 705 is configured to receive milk from the receptacle 708 via a connector 10, which can be any of the connectors 10, 210, 310, 410, as described herein and supply it to the dispensing nozzle 701.

The source of milk may comprise any suitable receptacle 708 which is connectable to the machine 700 via the connector 10. The connection may be via a conduit in the form of a tube or pipe 709. The conduit may be an open ended pipe or so-called 'wand' which is inserted into the milk for extraction. The conduit may comprise an attachment feature 709a for attaching the conduit to the receptacle 707 and to prevent accidental removal or displacement.

The dispensable fluid connector 36 may be any described herein and provide the dispensable fluid inlet which is in fluid communication with milk via the conduit 709. The dispensable fluid connector 36 may comprise the conduit 709 as an integral part thereof, or may comprise an attachment feature to which the conduit can be attached thereto. For example, the dispensable fluid connector 36 may comprise a nipple over which a conduit can be sealably received via an interference fit. Other attachments will be possible.

The main body 12, may be any of the main bodies described herein and comprise a cleaning fluid inlet for receiving a cleaning fluid from conduit 714 and outlet which is connected to the dispensing nozzle via conduit 718 which passes through the milk module 705. The milk module 705 may be a milk foamer as known in the art for example.

The dispensing machine 700 comprises a cleaning system with which a cleaning fluid can be circulated through the machine and connector 10 in order to clean the various constituent parts. The cleaning system may comprise one or more source of a cleaning fluid and a cleaning fluid conduit.

The cleaning fluid may be water, steam or an appropriate cleaning solution comprising a cleaning agent. As such, the dispensing machine 700 may comprise a cleaning agent dispenser 706 which dispenses a cleaning agent or fluid as required.

The cleaning system may comprise a fluidic circuit which will include at least one cleaning fluid conduit 714 to deliver cleaning fluid to the connector's 10 cleaning fluid inlet. In some embodiments, the cleaning system be configured to incorporate the cleaning of other elements of the dispensing apparatus such as the coffee brewer 703 and nozzle 701, for example. As such, the cleaning fluid system may comprise a cleaning fluid conduit to each of the constituent parts of the apparatus which are to be cleaned. The cleaning fluid conduits may utilise other conduits within the apparatus or be a dedicated cleaning fluid conduit.

The cleaning system and cleaning fluid conduit may comprise a closed circuit in which cleaning agent can be continuously circulated, or a be an open circuit in which cleaning agent is dispensed to a drain 711. The drain may be provided by or at the nozzle 711 in some embodiments.

It will be appreciated that the dispensing apparatus 700 may include other conduits, valves and pumps, as known in art, in order to enable the coffee and milk dispensing functions and cleaning function. For example, the milk module 705 may comprise a pump for pumping milk out of the milk receptacle 708 and the junction provided in the pipework between the drain conduit and milk dispensing conduit attached to the nozzle 701 may comprise a valve to allow a selection between the two conduits to be made. It will also be appreciated that each of the modules may be connectable to the drain 711. The outlet from the connector 10 may be directly connectable to the drain 711 for the purposes of expelling spent cleaning fluid during a cleaning operation, prior to being reconnected to the outlet nozzle 701 following the cleaning operation. Thus, the outlet and/or conduits attached thereto, may be reconfigurable between a cleaning configuration and a dispensing configuration. This may be achieved using the controller and conventional valves etc. As noted in connection with FIG. 1, the machine may comprise one or more valves, e.g. valve 32 shown in FIG. 1, which are operable to isolate the cleaning fluid.

The coffee dispensing machine 700 may comprise a controller 713. The controller 713 may be a conventional controller comprising a user interface. The user interface may be configured to receive instructions from a user and/or to provide a display for providing a user with information. The user interface may, for example, comprise an output display 715 and an input device 717 such as a touch screen input device or one or more buttons to enable a user to select options or operating the machine.

The controller 713 may be configured to allow a user to select a beverage type to dispense or to select a cleaning operation, for example, and/or be configured to providing levels of stock in the machine or the operating status, for example.

The controller 713 may comprise a timer and/or scheduler to allow cleaning operations to be carried out at specified times and/or according to a predetermined schedule. Thus, the controller 713 may be configured to carry out a cleaning operation automatically and without user interaction. Due to the connector 10 being connectable to the cleaning circuit regardless of whether a source of milk is attached to the connector, the user is not required to carry out any specific actions with regards to the milk supply prior to a cleaning operation and so cleaning can be scheduler in line with a preferred time of day or week.

In use, a user may manually attach a source of dispensable fluid to the dispensable fluid apparatus, prior to dispensing a drink. Following the connection of the dispensable fluid, the connector may undergo a cleaning operation. In an alternative embodiment, the dispensable fluid may be disconnected prior to the cleaning operation.

An advantage of the connector of the present disclosure is that it can be used in a cleaning cycle regardless of whether the source of dispensable fluid is attached or not. Thus, in use, a user may connect a source of dispensable fluid such as milk to the apparatus using the connector. Prior to disconnecting the source of dispensable fluid, the apparatus may be configured to undergo a cleaning operation. In another instance, the source of dispensable fluid may be disconnected from the apparatus. The apparatus may then be configured to undergo the cleaning apparatus without reconfiguring the connector, or the apparatus in relation to the connector.

The dispensable fluid connector 36 may be a disposable component such that it does not require cleaning and can be changed at regular intervals and in accordance with predetermined schedule. For example, the dispensable fluid connector 36 may be replaced on a daily basis, or when the dispensable fluid is replenished. In other embodiments, the dispensable fluid connector may be cleaned as part of a separate cleaning operation.

In one embodiment, the method of (autonomous) cleaning may comprise the closing of the outlet dock to isolate the source of dispensable fluid, so that the apparatus can go into a cleaning mode. Preferably, all sub-systems may then be flushed to remove any dispensable fluid remains from the dispensable fluid circuit. Cleaning fluid can then be dispensed into the dispensable fluid circuit. This may occur from a reservoir containing cleaning fluid. The apparatus may heat the cleaning fluid to a temperature of at least 50° C., preferably at least 60° C., preferably at least 70° C., and most preferably approximately 75° C. The apparatus may circulate the cleaning fluid through all sub-systems at the elevated temperature, for a selected time period, for example, at least 2 minutes, preferably at least 3 minutes, preferably at least 4 minutes, and more preferably at least 5 minutes. The cleaning fluid can then be drained from the dispensable fluid circuit. Preferably all subsystems are then flushed to remove any remaining cleaning fluid. The outlet dock can then be opened to return the apparatus to the dispensing mode.

The apparatus may be used in an intermediate rinse mode in which the outlet dock may be closed to isolate the source of dispensable fluid, so that the apparatus can go into an intermediate rinse mode. Preferably, all sub-systems may then be flushed to remove any dispensable fluid remains from the dispensable fluid circuit. After this, the outlet dock can then be opened to return the apparatus to the dispensing mode.

Providing a disposable dispensable fluid connector allows the cleaning operation to be further automated as no user interaction is required to modify or reconfigure the connector for a cleaning process. Where the dispensable fluid connector is disposable, it may be manufactured from an eco-friendly material. For example, the disposable dispensable fluid connecter may be manufactured from a biodegradable material. The biodegradable material may be polylactic acid, PLA, which is known in the art.

The one or more embodiments are described above by way of example only. Many variations are possible without departing from the scope of protection afforded by the appended claims.

The invention claimed is:

1. A connector for manually connecting a dispensable fluid to a fluid dispensing apparatus, the connector comprising:

a main body comprising a cleaning fluid inlet and an outlet;

a dispensable fluid connector which is detachably attachable to the main body and comprising a dispensable fluid inlet; and, wherein the cleaning fluid inlet is in fluid communication with the outlet via a cleaning fluid flow path, and wherein the dispensable fluid inlet is in fluid communication with the outlet via a dispensable fluid flow path;

wherein the outlet is in fluid communication with the cleaning fluid inlet to provide a cleaning fluid flow path through the main body and/or the dispensable fluid connector; and wherein the cleaning fluid flow path comprises a first cleaning fluid flow path through the main body, and a second cleaning fluid flow path through the dispensable fluid connector and the dispensable fluid connector is configurable to select either the first or second cleaning fluid flow paths.

2. The connector of claim 1, wherein the cleaning fluid flow path and dispensable fluid flow path are connected at a convergence upstream of the outlet.

3. The connector of claim 1, further comprising a one-way valve in the dispensable fluid flow path and/or the cleaning fluid flow path.

4. The connector of claim 3, wherein the one-way valve is a duck bill valve.

5. The connector of claim 1, wherein the main body comprises a first body portion and a second body portion configured to rotate relative to each other between a first configuration in which the cleaning fluid inlet is connected to the outlet via the first cleaning fluid flow path, and a second configuration in which the cleaning fluid inlet is connected to the outlet via the second cleaning fluid flow path.

6. The connector of claim 5, wherein the dispensable fluid connector is rotatable relative to the main body, wherein rotation of the dispensable fluid connector relatively rotates the first and second body portions between first and second positions to provide the first and second configurations.

7. The connector of claim 1, wherein the dispensable fluid connector and the main body are connected by an inter-engagement of a projection and a channel to provide a bayonet fitting, wherein the main body comprises the channel and the dispensable fluid connector comprises the projection which is received by the channel.

8. The connector of claim 1, wherein the dispensable fluid connector comprises a tube for insertion into a container or wherein the dispensable fluid connector is connectable to a container.

9. The connector of claim 1, wherein the dispensable fluid connector comprises an external surface, wherein the external surface comprises a gripping feature.

10. A fluid dispensing apparatus comprising the connector of claim 1.

11. The apparatus of claim 10, wherein the apparatus is a coffee dispensing machine and the dispensable fluid is milk.

12. The apparatus of claim 10, wherein the connector forms part of a cleaning fluid circuit.

13. The apparatus of claim 12, wherein the cleaning fluid circuit comprises one or more of a cleaning agent dispenser, a water supply, a water heater, a drain, a fluid dispensing nozzle for dispensing fluid from the apparatus.

14. The apparatus of claim 10, wherein the connector is fixedly attached to the apparatus.

15. The apparatus of claim 10, wherein the dispensable fluid is milk and the apparatus further comprises a source of milk attached to the connector.

16. The connector of claim 1, wherein the dispensable fluid connector is disposable and optionally made from a biodegradable material.

* * * * *